Patented Mar. 17, 1953

2,631,970

UNITED STATES PATENT OFFICE 2,631,970

METHOD FOR PURIFICATION OF ALCOHOLS CONTAINING OXIDIZABLE IMPURITIES

David K. Barnes, Tulsa, Okla., assignor to Stanolind Oil and Gas Company, Tulsa, Okla., a corporation of Delaware No Drawing. Application September 24, 1949, Serial No. 117,715

9 Claims. (Cl. 202—57)

The present invention relates to the purification of alcohols and more particularly, it pertains to a procedure for the removal of oxidizable contaminants therefrom.

It is known that synthetically or biochemically produced alcohols generally possess certain oxidizable contaminants, the last traces of which are substantially impossible to remove even by means of highly efficient fractionating columns. The presence of such contaminants is highly objectionable where alcohols containing these impurities are employed in the preparation of film-forming compositions because of the fact that, on standing, the resulting film tends to discolor. Moreover, these contaminants, under ordinary conditions, oxidize to produce compounds having a disagreeable odor and which impart undesirable properties to the alcohol. Ethanol containing these oxidizable contaminants is likewise exceedingly undesirable for use as a fortification or blending agent in the manufacture of alcoholic beverages owing to the characteristic disagreeable odor and flavor which such contaminants impart thereto. Because of the obvious advantages of alcohols which have these undesirable contaminants removed, it has long been the desire of alcohol manufacturers to find an economical and efficient method for accomplishing this object. This is especially true in the case of ethanol where spirit grade alcohol, i. e., ethanol having a permanganate time of at least 45 minutes, commands premium prices.

In U. S. Patent 1,987,601 granted to J. P. Burke, it has been proposed to remove contaminants such as aldehydes from alcohols of the type included within the scope of the present invention, for example, by refluxing a mixture of the crude alcohol with an acid salt of a primary amine such as ethylamine or aniline so that the amine may react with the aldehydes present and thereafter recovering a distillate of alcohol having a substantially reduced concentration of aldehydes. While the foregoing procedure may render alcohols suitable for numerous uses, it is wholly ineffective to yield alcohols of the spirit grade variety.

Accordingly, it is an object of my invention to provide a process by which oxidizable impurities of the type normally found in alcohols such as, for example, methanol, ethanol, propanol, isopropyl alcohol, and the like, may be completely removed therefrom by treatment of the contaminated alcohol with a relatively small quantity of a hydroxylamine compound. It is another object of my invention to provide a method for further removing said oxidizable contaminants from alcohols in which the aldehyde concentration thereof is sufficiently low to give a negative fuchsin test. It is a further object of my invention to provide a method for obtaining high quality spirit grade ethanol by treating solutions of the latter containing the aforesaid oxidizable contaminants with a hydroxylamine compound and thereafter separating the ethanol in a form sufficiently pure to meet spirit grade ethanol specifications.

The exact nature or structure of the oxidizable contaminants which occur in alcohols is not accurately known. While it has previously been thought that aldehydes may be the principal objectionable impurities contained therein, I have observed that solutions of alcohols which are negative with respect to the standard fuchsin aldehyde test, i. e., alcohols containing less than two parts per million of aldehyde, give highly unsatisfactory permanganate times, viz., of the order of 5 to 6 minutes.

I have now discovered that alcohols of extremely high purity and relatively long permanganate times may be obtained by treating the contaminated alcohol, especially contaminated dilute aqueous solutions thereof, i. e., containing about 5 to 25 weight per cent alcohol, with a hydroxylamine compound of the type $$NH_2O—R$$

in which the substituent "R" may be hydrogen, alkyl, aryl, or the like. As typical examples of hydroxylamines included by the above generic formula and which are contemplated by my invention, there may be mentioned hydroxylamine, α-ethylhydroxylamine, α-methylhydroxylamine, α-phenylhydroxylamine, α-phenylethylhydroxylamine, hydroxylamine hydrochloride, hydroxylamine sulfate, hydroxylamine acetate, and the like. In this connection it has been my observation that the $NH_2O—$ portion of the hydroxylamine molecule is the grouping responsible for the desirable results obtained by the process of my invention, and that the nature of the radical substituted for the substituent "R" in the above generic structural formula has little or no effect upon the operability of such process. Accordingly, the expression "hydroxylamine compound" appearing in the present description, as well as in certain of the claims, is to be interpreted as referring only to derivatives of hydroxylamine having the characteristic structure $NH_2O—$ or the corresponding mineral or organic acid salts thereof.

In accordance with a preferred embodiment of my invention, a hydroxylamine compound of the type generally set forth above is preferably added to the alcohol to be treated. Thereafter the resulting mixture is distilled to obtain the pure alcohol or an aqueous azeotropic mixture thereof leaving as a still residue the relatively non-volatile products formed by the interaction of the hydroxylamine with the oxidizable contaminants.

The process of my invention is especially applicable to the purification of various water soluble alcohols obtained by the reduction of carbon monoxide with hydrogen over a fluidized promoted iron catalyst at temperatures of 500° to 700° F. and pressures of from 150 to 450 p. s. i. g. For example, in obtaining the fraction produced by the aforesaid process, the original water layer, which contains the major portion of the ethanol present, is subjected to a series of extractive distillation steps to remove the water soluble aliphatic acids, acetaldehyde, propionaldehyde, butyraldehyde, acetone, methyl ethyl ketone, methyl propyl ketone, methanol, and isopropyl alcohol. The original water layer, after the aforesaid materials have been separated therefrom, consists essentially of a dilute solution, usually about 5 weight per cent, of ethanol in water. Such a solution is normally negative to the fuchsin aldehyde test, but the ethanol obtained therefrom still is far below the standard required for a beverage or spirit grade alcohol, having a permanganate time usually not greater than 5 or 6 minutes.

Although effective removal of oxidizable contaminants may be accomplished by adding the hydroxylamine compound directly to the dilute alcohol solution to be purified prior to the distillation step, a substantial saving may be brought about by introducing into the fractionating column a solution of the hydroxylamine compound in a suitable concentration at a point above the dilute alcohol feed line since the concentration of alcohol and contaminants increases markedly on the higher plates in the fractionating column. With dilute ethanol feeds it has been my observation that the hydroxylamine compound charged directly to the feed in a concentration of about 100 parts per million is sufficient to effect a complete clean up of oxidizable contaminants. Similar concentrations of hydroxylamine in less dilute ethanol effects the same degree of purification; and since the liquid ethanol on the plates above the feed point is from about 10 to 20 times more concentrated than the feed itself, the total amount of hydroxylamine required is proportionally decreased.

The quantity of hydroxylamine employed depends on several factors such as the concentration of alcohol in the solution to be treated, the particular hydroxylamine utilized and whether it is employed in the form of a free base or as a mineral acid salt thereof. Thus, with relatively dilute alcoholic solutions, i. e., 5 to 25 weight per cent, the highly polar acid salts of hydroxylamine are substantially more soluble than in solutions containing 80 to 95 per cent alcohol. Free hydroxylamine compounds in which the substituent "R" in the above-mentioned generic formula represents a hydrocarbon radical having no more than 9 carbon atoms are generally readily soluble in dilute aqueous alcoholic solutions, while the mineral acid salts of both the lower and higher molecular weight hydroxylamines are rather readily soluble in dilute aqueous alcohol. The higher molecular weight free hydroxylamines are soluble to an appreciable extent only in solutions of higher alcohol content. In order to effect satisfactory removal of all of the undesired oxidizable contaminants, however, a sufficient quantity of the hydroxylamine compound should be added to allow at least about 0.01 to 0.05 weight per cent of said compound to dissolve in the solution. In general, I prefer to employ a hydroxylamine or a mixture of hydroxylamines in which the above-mentioned "R" group represents either hydrogen or contains no more than 9 carbon atoms.

The process of my invention may be further illustrated by the following example in which the marked superiority of various of the hydroxylamines over aniline and ethylamine hydrochloride is demonstrated.

EXAMPLE

The aqueous fraction obtained by the synthesis of hydrocarbons from carbon monoxide and hydrogen was first processed to remove essentially all of the ketones, aldehydes, acids, and esters. The fraction thus obtained contained about 5 weight per cent ethanol, however, no aldehydes could be detected by test with fuchsin. The solution was divided into six 1200 ml. samples after which aniline hydrochloride and ethylamine hydrochloride were separately added to individual samples and hydroxylamine hydrochloride was added to three of the samples, all in the concentrations listed in the table below. The sixth sample was run as a blank. Each portion was distilled at a reflux ratio ranging from 20 to 40:1 and permanganate times for each 10 ml. of distillate determined. The results obtained are shown below.

Table

PERMANGANATE TIMES IN MINUTES

| Cut No. | Control | Weight Percent Ethylamine Hydrochloride 0.064 | Weight Percent Aniline Hydrochloride 0.1 | Weight Percent Hydroxylamine-HCl | | |
|---|---|---|---|---|---|---|
| | | | | 0.1 | 0.025 | 0.0125 |
| 1 | 1 | 7 | 1 | 40 | 54 | 50 |
| 2 | 1 | 12 | 1 | 46 | 58 | 60 |
| 3 | 1 | 19 | 1 | 45 | 52 | 50 |
| 4 | 1 | 10 | 1 | 41 | 53 | 56 |
| 5 | 3 | 4 | 1 | 47 | 55 | 54 |
| 6 | 3 | 2 | 8 | 50 | 50 | 55 |

Hydroxylamine sulfate, α-methylhydroxylamine, α-ethylhydroxylamine, α-phenylhydroxylamine, and α-phenylethylhydroxylamine when substituted for hydroxylamine hydrochloride and added in concentrations ranging from 0.0125 to 0.1 weight per cent give ethanol having a permanganate time in excess of 45 minutes. Alcohol obtained as a result of the above treatment contains less than one-half part per million of oxidizable impurities.

From the data appearing in the table, it is evident that both aniline and ethylamine are wholly ineffective to improve the permanganate time of alcohol containing extremely small amounts of oxidizable contaminants. On the other hand, it has been demonstrated that hydroxylamines of the type contemplated by the present invention are very effective in removing the last traces of objectionable oxidizable impurities to give ethanol having a sufficiently high permanganate time to meet the requirements of spirit grade alcohol.

The foregoing examples and description are to be interpreted as being only illustrative of the scope of my invention and are to be in no way regarded as limitative thereof. It will be readily apparent to those skilled in the art that the process described above is susceptible of numerous modifications without departing from the scope of the present invention. Thus, for example, mixtures of alcohols containing oxidizable contaminants may readily be purified by adding thereto a suitable hydroxylamine compound or mixtures of such compounds and thereafter distilling the resulting mixture to obtain the alcohols free from oxidizable impurities.

What I claim is:

1. A method for the purification of alcohols produced by the reduction of carbon monoxide with hydrogen, said alcohols being negative to the fuchsin aldehyde test but which contain impurities oxidizable by permanganate comprising mixing with the impure alcohol at least about 0.01 weight per cent of an alpha hydroxylamine compound and thereafter distilling the resulting mixture to obtain an alcohol free from said oxidizable contaminants.

2. A method for the purification of alcohols produced by the reduction of carbon monoxide with hydrogen, said alcohols being negative to the fuchsin aldehyde test but which contain impurities oxidizable by permanganate which comprises mixing with an aqueous solution containing 5 to 25 weight per cent alcohol together with oxidizable contaminants at least about 0.01 weight per cent of an alpha hydroxylamine compound and thereafter distilling the resulting mixture to obtain an alcohol free from said oxidizable contaminants.

3. The method of claim 1 in which hydroxylamine hydrochloride is the hydroxylamine compound employed.

4. The method of claim 1 in which hydroxylamine hydrosulfate is the hydroxylamine compound employed.

5. The method of claim 1 in which alpha-methylhydroxylamine hydrochloride is the hydroxylamine compound employed.

6. A method for the preparation of spirit grade ethanol from dilute solutions derived from the reduction of carbon monoxide with hydrogen, said solutions being negative to the fuchsin aldehyde test but which contain contaminants oxidizable by permanganate which comprises mixing with said solution at least about 0.01 weight per cent of an alpha-hydroxylamine compound, and thereafter distilling the resulting mixture to obtain ethanol having a permanganate time of at least 45 minutes.

7. The process of claim 6 in which hydroxylamine hydrochloride is the hydroxylamine compound employed.

8. The process of claim 6 in which hydroxylamine hydrosulfate is the hydroxylamine compound employed.

9. The process of claim 6 in which alpha-methylhydroxylamine hydrochloride is the hydroxylamine compound employed.

DAVID K. BARNES.

REFERENCES CITED

The following references are of record in the file of this patent:

UNITED STATES PATENTS

| Number | Name | Date |
|---|---|---|
| 625,108 | Hewitt | May 16, 1899 |

OTHER REFERENCES

Shriner and Fuson, Identification of Organic Compounds, Second Edition, published 1940 by John Wiley and Sons, Inc., pages 139, 140, 167, 168, 188, 189, 221, and 222.

Fuson and Snyder, "Organic Chemistry," published 1942, by John Wiley and Sons, copy in Library of Congress, pages 72, 73, 79 and 80.